(12) United States Patent
Lee (10) Patent No.: US 8,371,506 B2
(45) Date of Patent: Feb. 12, 2013

(54) HANDHELD BARCODE CODE INPUT DEVICE WITH NO-POWER SUPPLIED SWITCH TRIGGER

(75) Inventor: Hanjin Lee, Skillman, NJ (US)

(73) Assignee: Koamtac, Inc., Princeton, NJ (US)

( * ) Notice: Subject to any disclaimer, the term of this patent is extended or adjusted under 35 U.S.C. 154(b) by 0 days.

(21) Appl. No.: 13/014,446

(22) Filed: Jan. 26, 2011

(65) Prior Publication Data
US 2012/0187192 A1  Jul. 26, 2012

(51) Int. Cl.
*G06K 7/10* (2006.01)
(52) U.S. Cl. .............. 235/462.3; 341/20; 714/300
(58) Field of Classification Search ........ 235/462; 713/300–340; 341/20
See application file for complete search history.

(56) References Cited

U.S. PATENT DOCUMENTS

| | | | |
|---|---|---|---|
| 5,340,972 A | 8/1994 | Sandor | |
| 5,675,138 A | 10/1997 | La | |
| 5,808,289 A | 9/1998 | Becker | |
| 5,907,147 A | 5/1999 | Chay | |
| 6,234,393 B1 | 5/2001 | Paratore et al. | |
| 6,619,549 B2 | 9/2003 | Zhu et al. | |
| 6,688,526 B2 | 2/2004 | Metlitsky et al. | |
| 7,044,383 B2 | 5/2006 | Zhu et al. | |
| 7,077,327 B1 | 7/2006 | Knowles et al. | |
| 7,097,101 B2 | 8/2006 | Kogan et al. | |
| 7,244,944 B2 | 7/2007 | White | |
| 7,686,226 B2 | 3/2010 | Zhu et al. | |
| 2006/0108425 A1* | 5/2006 | Wiklof | 235/462.44 |
| 2009/0272811 A1* | 11/2009 | An | 235/462.44 |
| 2010/0106098 A1* | 4/2010 | Atterbury et al. | 604/207 |

* cited by examiner

*Primary Examiner* — Michael G Lee
*Assistant Examiner* — Matthew Mikels
(74) *Attorney, Agent, or Firm* — Robert Gorman; Gorman Law Offices (57) ABSTRACT

A device for scanning a bar code symbol is adapted to be worn comfortably on an operator's bare or gloved hand, arm, or wrist which does not interfere with normal use of the hand. When provisioned with a glove, a portable bar code scanner means is secured on the back of the glove and is electrically connected to an activation switch disposed at a button provided at the end of a cable for manipulation by a thumb or other finger. The activation switch triggers the portable bar code scanner means to scan a bar code symbol to be read.

9 Claims, 7 Drawing Sheets

HANDHELD BARCODE CODE INPUT DEVICE WITH NO-POWER SUPPLIED SWITCH TRIGGER

BACKGROUND OF THE INVENTION

1. Field of the Invention

The present invention relates to a portable, hand held bar code input device with an optical scan element and user-friendly power-saving triggering attachment, the entirety of which can be worn on the arm, wrist or back of the hand and allows the user to scan a bar code symbol by simply pressing the trigger when it is connected to the portable hand held bar code input device.

2. Description of Related Art

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

Different code readers or scanners are known in the prior art for reading various symbols such as bar code symbols appearing on labels or on the surfaces of an article. Essentially, a bar code symbol is a coded pattern of indicia comprised of a series of bars of various widths spaced apart from one another to bound spaces of various widths, the bars and spaces having different light reflecting characteristics. Readers for scanning or imaging systems electro-optically transform the graphic indicia into electrical signals, which are decoded into information, typically descriptive of the article or some characteristic thereof.

When scanned, such characteristics are conventionally represented in digital form and are typically used as inputs for a data processing system for applications in point-of-sale processing, inventory control, records processing, logistical tracking systems, mailing and package delivery systems, and the like. To this end, many applications of the bar code readers require the operator to move about the readers and carry them from place to place, and as such, the readers must be easy to carry and operate. Hand-held devices have been developed to allow a user to aim the reader at a target bar code to be read. A problem with this type of reader is that the user frequently needs to enter data on a keyboard, hold job-related items or to perform any number of different manual tasks while his hands are already being utilized for the work currently being undertaken. Traditional hand-held bar code readers have required intermittently setting down the device to perform other manual tasks, or switching to the other hand to facilitate the use of the hand for other operations. Additionally, in certain jobs such as law enforcement, military occupations, or security guard stations, it may represent a security concern to utilize one or more open hands to actually hold a bar code scanner in the course of scanning IDs, documents and other bar-code bearing particulars.

Prior art systems, each of which is hereby incorporated by reference in their respective entireties and as described below, have attempted to address this by providing for bar code readers that can be adapted to be worn on the back of a user's hand One type of hand-mounted device disclosed in U.S. Pat. No. 5,514,861 to Swartz, et al. is activated by pressing a button with the thumb. A drawback of the device is that the thumb must be bent in an awkward way to activate the button. Another hand-mounted device disclosed in U.S. Pat. No. 5,340,972 to Sandor is activated by flexing the fingers, this device is also undesirable because the bar code scan element is activated when both the index finger and the middle finger are in relaxed non-pointing positions followed by a pointing position of the index finger and the simultaneous relaxed non-pointing position of the middle finger. Another hand-mounted device disclosed in U.S. Pat. No. 4,766,299 to Tierney, et al. is activated by flexing the hand such as by clenching the hand into a fist or pointing a finger in the direction of the bar code. This device, like the other described types of readers requires unnatural movements of the hand to actuate the scan element.

An additional significant drawback of conventional hand-mounted readers is that they have complex optical systems that add bulk and high scan element costs. The scan element may include a laser scanning device mounted in housing, such that a laser is aimed in the direction of the bar code. These laser scanning systems generally comprise complicated systems such as lenses and mirrors to read a bar code symbol, thus increasing the bulk and expense of such systems. Conventional hand-mounted bar code readers have another drawback in that they generally include an integrated glove that incorporates a scan element in a housing that is often bulky and sits high on the hand or finger. Some users may be required to use additional gloves such as protective gloves for lifting inventory. Bulky conventional gloves incorporating the scan element can only be worn on a bare hand and would preclude the user from wearing any other type of glove.

A subsequent attempt to overcome some of the above deficiencies is found in U.S. Pat. No. 6,234,393 to Paratore which purportedly relates to a bar code scanning device, adapted on a glove, with an electrically connected activation switch disposed on a bottom finger tip of the glove. This attempt is also insufficient because, like the aforementioned patents, does not provide for an ergo-dynamic system that reduces repetitive stress injuries, and also does not provide for a truly compact, lightweight scanning device that can un-obtrusively rest on a users hand without interfering with work or without catching on outside objects.

More importantly, all of the above, as well as any other approaches for scanning use significant power, thereby requiring the user to constantly replace or recharge the batteries of the scanning devices. Further to this point, the known triggering mechanisms in the art are particularly power-hungry, in that there mechanisms drain additional power from the batteries by virtue of their operation. This is particularly so because all known devices use triggers that have been hitherto limited to the provision of power signal transmission to hand held scanners, thereby further consuming limited power reserves of battery packs and thereby limiting battery life.

Accordingly, a need exists for a low cost, low complexity hand-mounted bar code reader that allows a user to scan bar codes with a natural, ergo-dynamic, non-injurious motion, yet does so without compromising battery life through power-consuming triggering mechanisms.

SUMMARY OF THE INVENTION

Given the aforementioned drawbacks in known systems, the present invention therefore comprises a reinvention of the triggering mechanism such that any handheld device (such as a barcode reader) that is connected to the novel trigger mechanism would function only on demand, and would also minimize power usage by obviating the need for power signal transmissions. Without the present invention, handheld devices would rely on power signals from any given connected trigger, which would continually drain battery reserves of the handheld device. As such, the present invention overcomes this and other disadvantages inherent in the prior art.

The present invention relates to an improved approach to triggering hand held devices, such as compact bar code input devices (which also includes the use of scanners or readers), in a convenient, user-friendly and power-efficient way. The inventive hand held bar code readers with no-power triggering is deemed desirable for at least several reasons: (1) a user typically needs to employ bar code scanners in a way so as to minimize the repetitive fatigue associate with both the carrying and trigger manipulation of such devices, something which can only truly be accomplished through the use of the inventive compact, lightweight design for wearing on a hands-free accessible location such as affixing to the wrist, arm or back of a hand; and (2) when provided with the additional aspect of the inventive triggering, the present invention is especially valuable in that the actual triggering is achieved without the use of a power signal, such that the power reserve of the compact barcode scanner is thereby preserved. Provision of such is specifically accomplished through the usage of transmission of a ground signal that is transmitted upon depressing the easily accessible trigger button to the compact handheld scanner (rather than transmission of a power signal to the compact handheld scanner) thereby initiating the powering of a scan of a given barcode, until acquisition of the scanned barcode.

At its broadest level, the present invention therefore provides for a bar code input device, comprising: a bar code scanner; an attachment means for attaching said bar code input device to a body of an operator within a general vicinity and at in a general direction of a bar code symbol to be scanned by said bar code scanner during a scanning operation, the attachment means further being situated on an operator's body so as not to interfere with normal use of hands of said operator; and a trigger means connected to the scanning means for energizing said scanning means, wherein the trigger means may further comprises a push button that, when depressed, actuates a ground signal at the scanning means for energizing the scanning means. The bar code input device also may comprise: a glove adapted to be worn on a system operator's hand; the trigger means actuating the ground signal so as to turn on the bar code scanner continuously for a fixed time until a good bar code read occurs during a given said scanning operation; a coupling means (such as a hardwired connection, a radio frequency medium, etc.) for coupling the push button to the bar code scanner; and wherein the bar code input device is adapted for both ambidextrous and hands-free operation and is further adapted so as to provide an ergo-dynamic, changeable positioning of the trigger means so as to reduce repetitive stress injuries.

A more complete understanding of the finger point bar code input device will be afforded to those skilled in the art, as well as a realization of additional advantages and objects thereof, by a consideration of the following detailed description of the preferred embodiment. Reference will be made to the appended sheets of drawings which will first be described briefly.

DETAILED DESCRIPTION OF THE PREFERRED EMBODIMENT

The present invention provides a low cost, low complexity hand-mounted bar code input device that allows an operator to scan bar codes with a natural motion and to wear the device on a semi-bare or gloved hand while avoiding the complexity and drawbacks of conventional hand-mounted bar code readers, and by avoiding the usage of excessive power consumption that can rapidly drain the battery life of stand-alone devices. In the detailed description that follows, like element numerals are used to describe like elements shown in one or more of the figures.

In accordance with the teachings of this invention, a bar code input device or bar code scanner means with a power-saving trigger means, incorporated on a glove, is provided in one illustrative embodiment and is generally illustrated in perspective views shown in FIGS. 1a-1d. The device is simple and easy to use on a bare hand or on top of another glove. The power saving trigger is situated on the illustrative glove in such a way so as to further provide for an ergo-dynamic experience for the user whereby a switch or, in one embodiment, a button disposed proximate to the index finger, can when depressed, activate a scan element that effectively avoids interference with the normal use of the hand, as further depicted illustratively in FIG. 2. Hence, according to an embodiment of the invention depicted collectively in FIGS. 1a-1d and FIG. 2, the bar code input device is disposed on a glove worn at least on the back of a system operator's hand. The glove 120 comprises a wrist strap 140 and one or more finger cuff(s) or hood(s) 106, and secured on glove 120 are a bar code scanner means device or bar code reader 110 and coupled to bar code reader 110 is an activation switch means or trigger 100. The glove 120 is worn on the back of the hand, and is secured by a wrist strap 140 and one or more finger hood(s) 106. The glove 120 is ambidextrous and may be worn on either hand, and furthermore, the finger hood(s) 106 may also be provided for use on any one of the users fingers, but in one illustrative embodiment, will at least be provided for on the index finger in order to allow for securing of the trigger means 100 on the finger hood 106 of the outside of the index finger, immediately opposite the adjoining thumb, so as to be in close proximity to the adjacent thumb so that the user may easily depress a push button 104 with the tip or the inside surface area of the thumb. Based upon user preference and individual user ergodynamics, the specific location of the actual securing of the trigger means 100 on the finger hood 106 may be changeable or repositioned to different areas of the outside (or even the bottom) of the index finger of a given user. When provisioned as such, this triggering arrangement allows for minimal range of finger joint movement and reduced tendon contraction, thereby affording the aforementioned ergo-dynamic feature that reduces the risk of repetitive stress injuries such as carpal tunnel syndrome. Also, it is anticipated that the user or operator will not need to remove the glove 120 and the bar code reader system 110, 100 attached thereto in order to perform typical manual tasks such as operating machinery, lifting objects, and in the case of use by law enforcement, security personnel or military personnel, the user will not need to discontinue holding a firearm or other defensive accoutrements because the glove positions the bar code reader 110 and trigger 100 in a ready position for one-handed operation of the system while preserving normal use of the user's hand and arm.

Figure 1A:
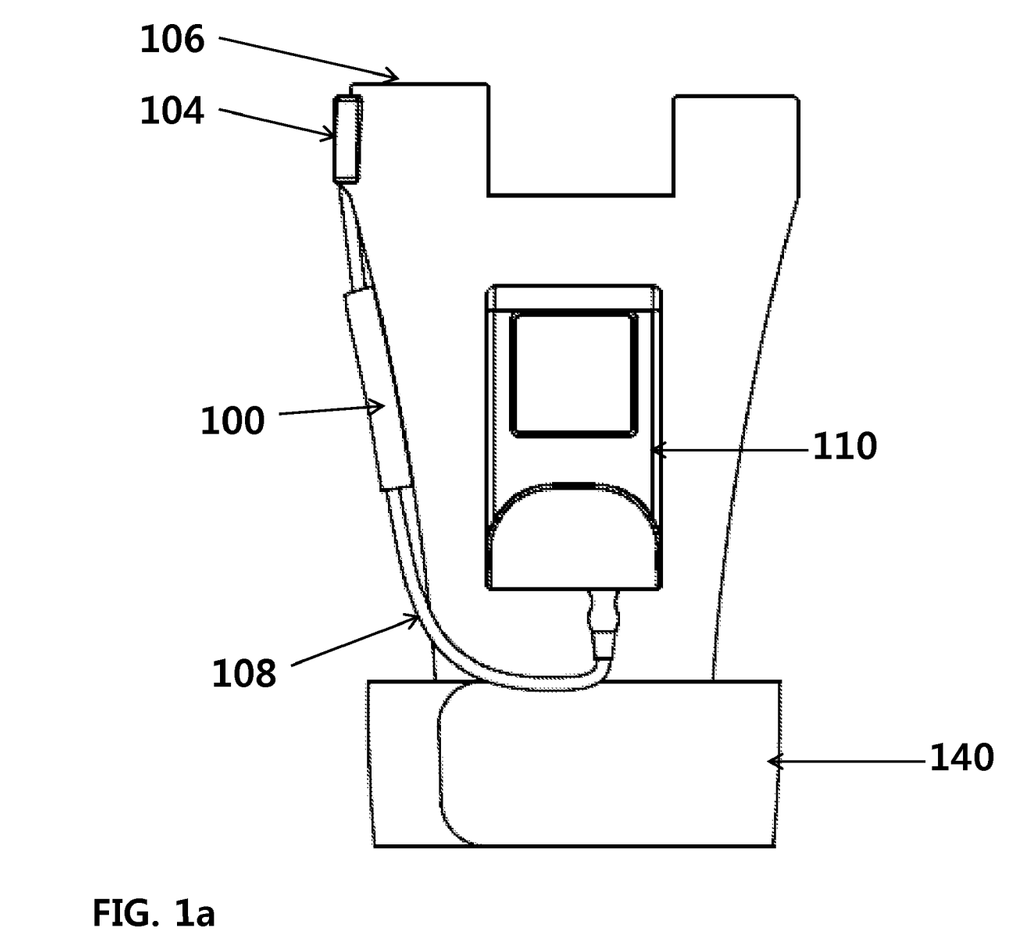
FIGS. 1a-1d are perspective views of an illustrative glove that contains a bar code scanner means and a trigger means coupled thereto.
Figure 1B:
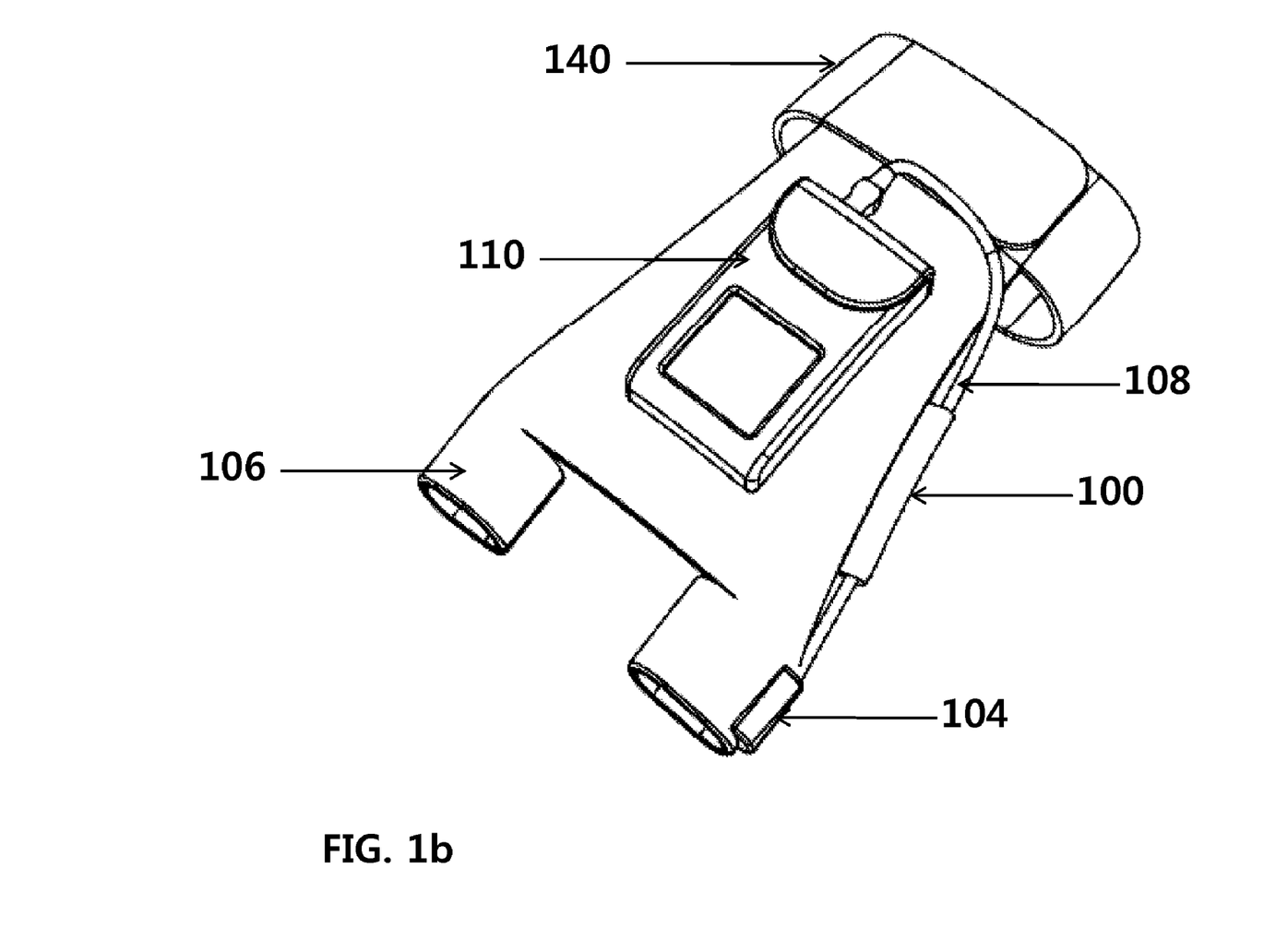
Figure 1C:
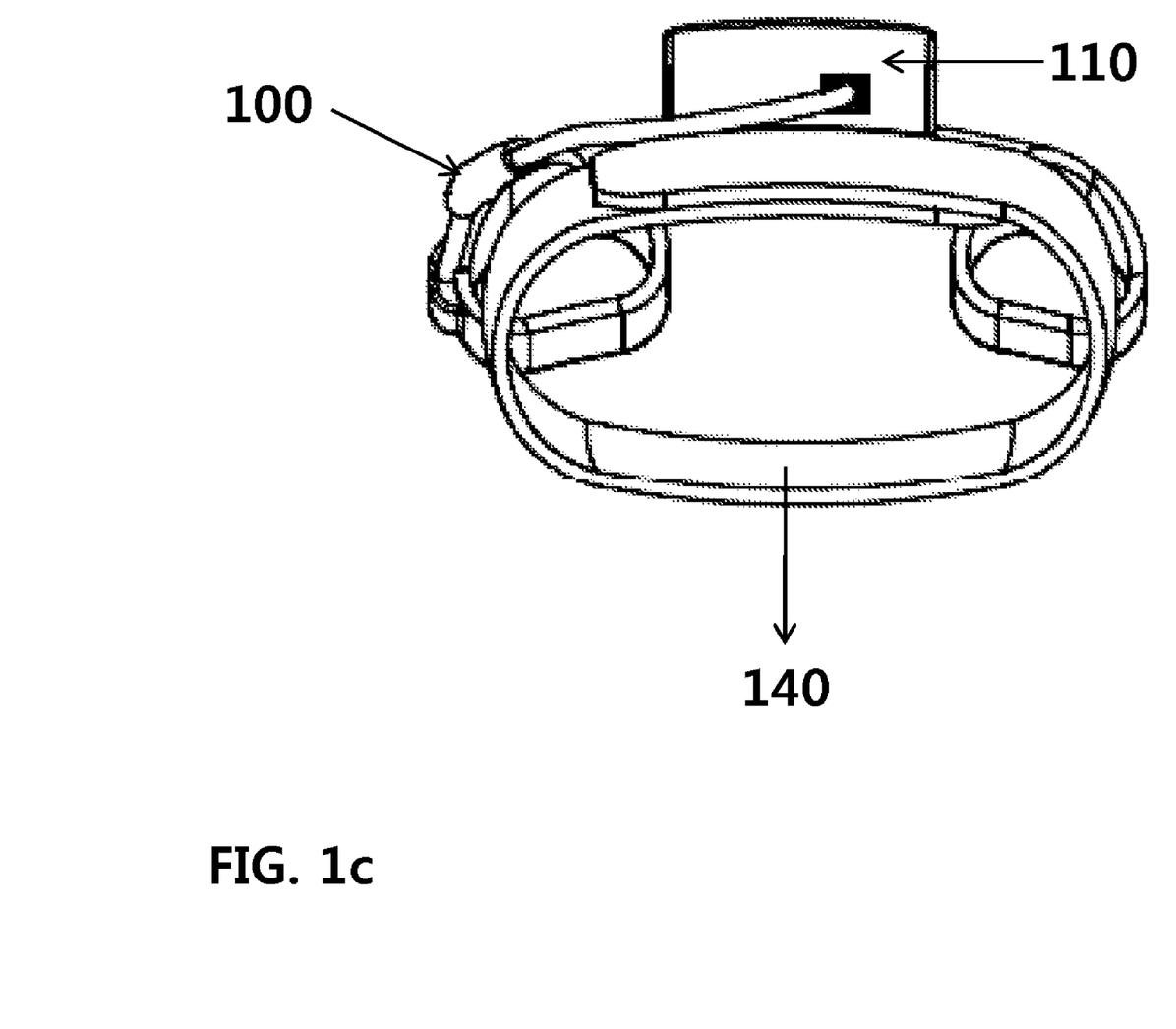
Figure 1D:
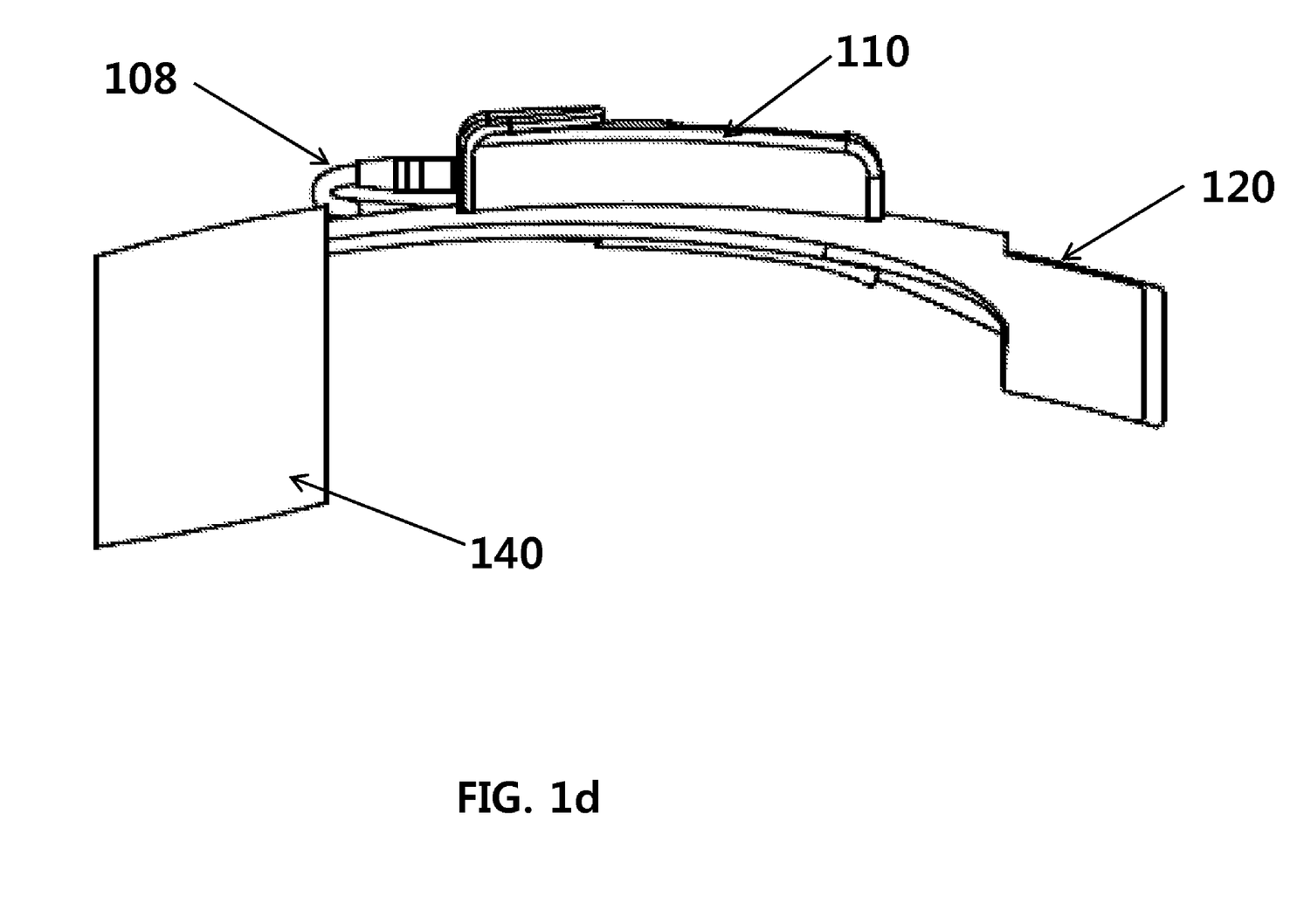
Figure 2:
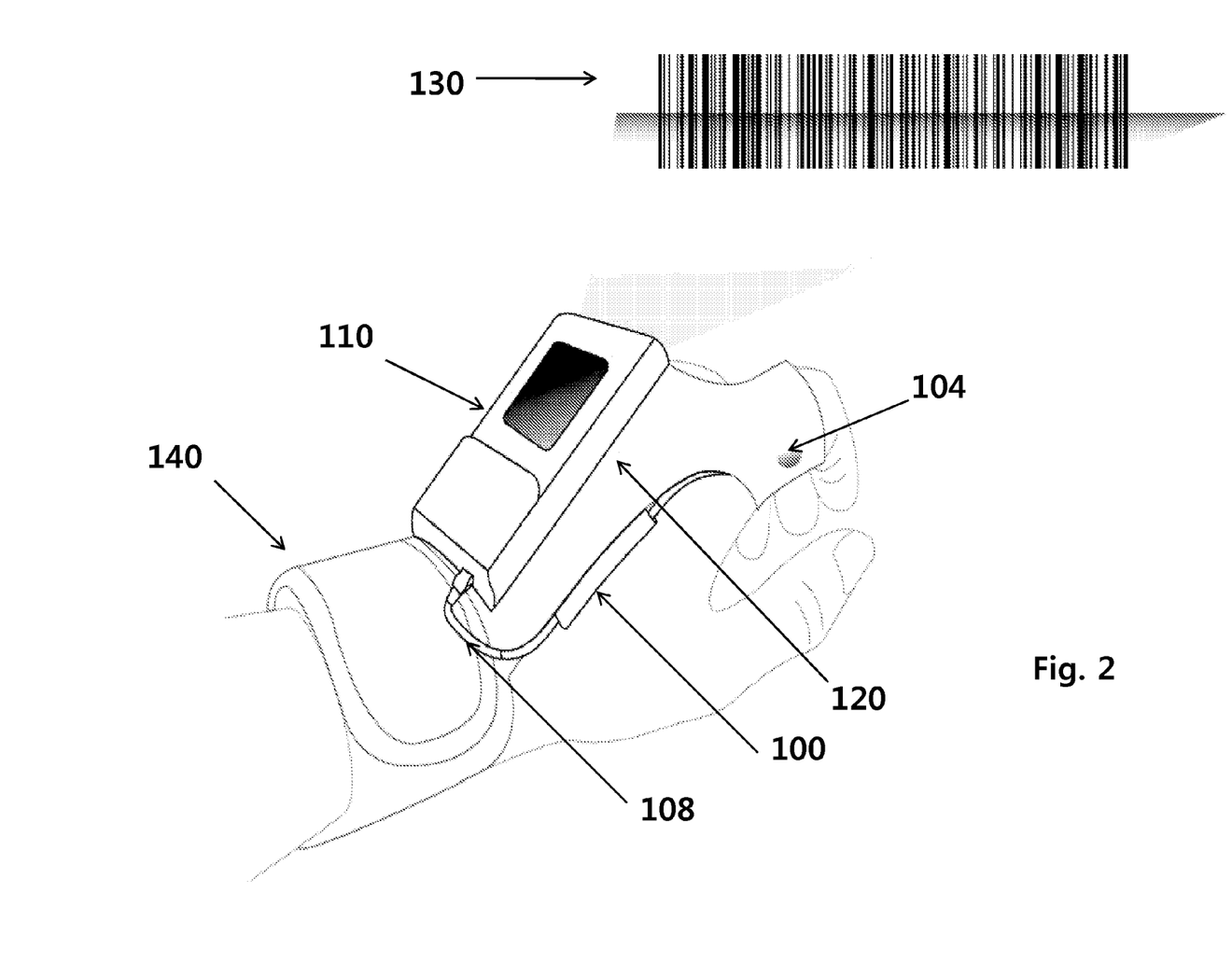
FIG. 2 is a plan view of a finger point input device disposed on the back of an operator's hand in accordance with an embodiment of the present invention positioned to scan a bar code symbol.

As shown in FIG. 2, the glove 120 covers only a portion of the back of the operator's hand. The glove 120 does not, in one illustrative embodiment, cover the bottom of the hand except for the finger hood and the wrist strap. It should be appreciated, however, that the glove can also be made to entirely cover any or all portions of the operator's hand. It is anticipated that the glove 120 will be flexible and comfortable enough to accommodate differences in the hand sizes of different operators. The glove is preferably made of durable, light, and flexible material so that the operator may wear it comfortably on a gloved or bare hand. The glove material is preferably made of nylon, but for certain applications, leather, cloth or a flexible plastic laminate would also be suitable materials. Also, the glove preferably includes flaps or loops (not depicted) into which trigger 100 and by extension, coupling 108 and push button 104 can be secured within one of the optional finger cuffs 106. The wrist strap 140 should also be sufficiently flexible to accommodate differences in operator wrist sizes. Preferably, the wrist strap is made of a flexible material that is comfortable to wear and commonly available and widely used in skin contact applications. For example, it can be an elastic band, or it can be made of leather or a sponge-like material to provide comfortable padding lined with a durable fabric such as nylon, cloth, etc. Wrist strap 140, and if needed, the flaps or loops can be fastened together by an attachment mechanism such as a hook and loop fastener like Velcro®, or some other type of fastening that is easily manipulated with one hand. Similarly, in an additional embodiment, the coupling 108 of trigger 100, and the bar code reader 110 may also be covered with a flexible cover (not depicted) that can both cushion bar code reader 110 from shock or damage, and can also serve so as to prevent snagging of coupling 108 during the course of work by a given user.

With continuing reference to FIGS. 1a-1d and FIG. 2, in one illustrative embodiment, the activation switch (trigger) 100 includes coupling means 108 and push button 104, and when the push button 104 is depressed once by the thumb of a user, this actuation activates, according to the inventive lower means discussed hereafter, a scanning element within bar code reader 110 so as to commence the scanning of a bar code 130 in a continuous operation of the scanning element for as long as it takes to obtain a complete or "good" scan. Although the illustrative embodiment depicts a hard-wired connection or coupling means 108, other approaches such as radio frequency medium may also be provided for in setting the signal communications between the bar code reader 110 and the activation switch or trigger 100. Thereafter, the bar code reader 110 may provide outputs to a control unit (not depicted) located separately from the glove.

Figure 3A:
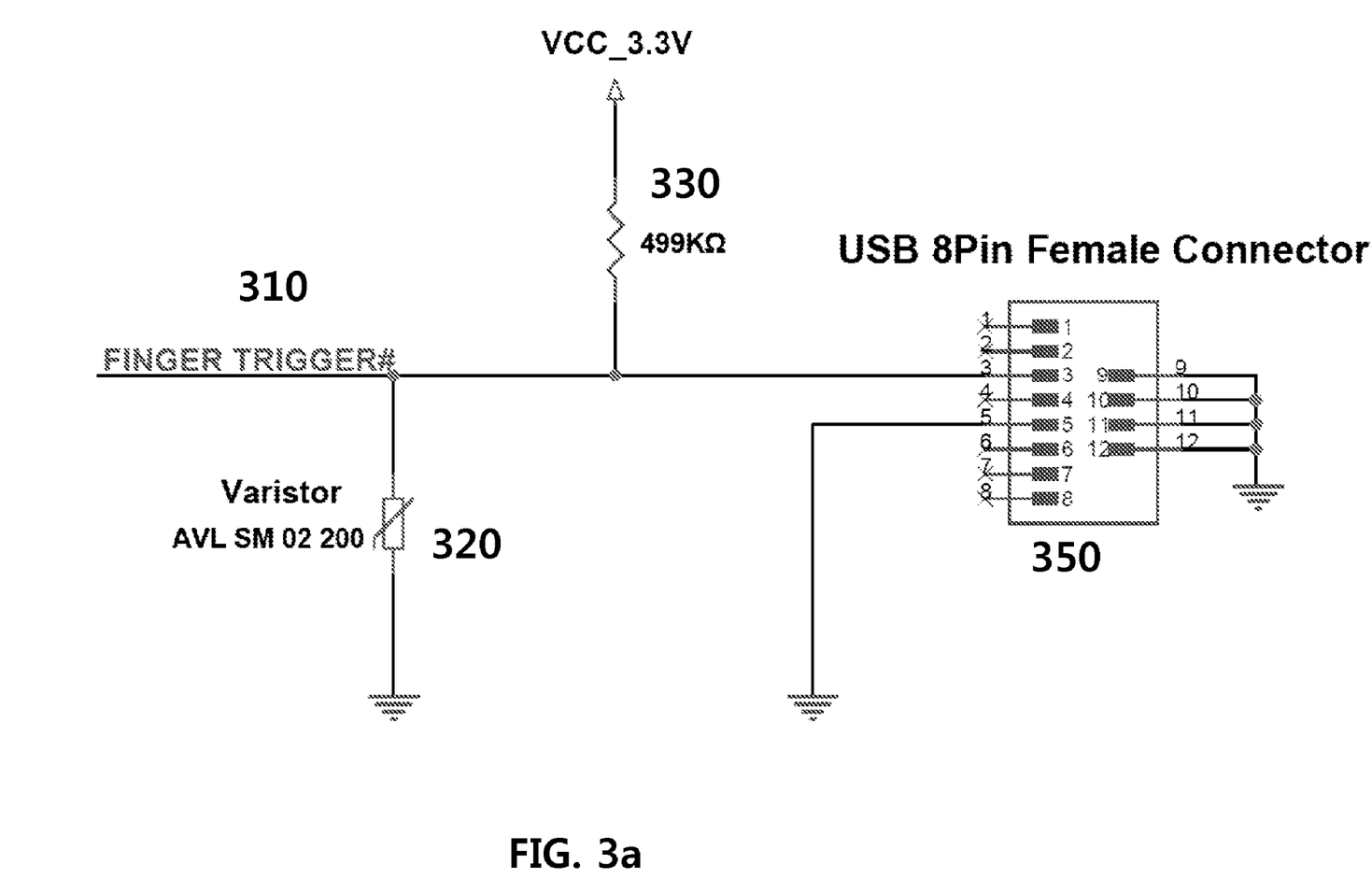
FIGS. 3a-3b are simplified electrical block diagrams of one possible embodiment of the trigger and ground signal-based circuitry within the present invention.
Figure 3B:
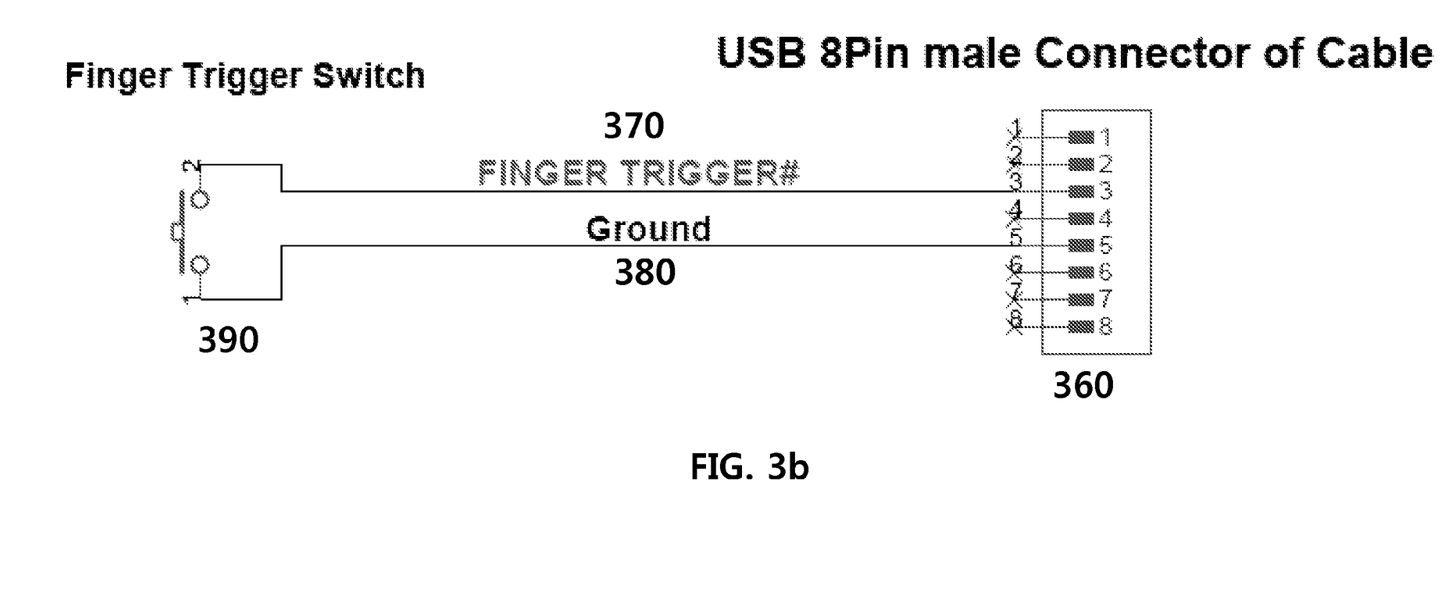

Referring now to FIG. 3, an electrical block diagram depicts an illustrative embodiment of the ground signal-based activation circuit of the present invention. The illustrative bar code reader 110 may be of the type such as that produced under the model names KDC® 100, 200 or 300 by Koamtac® of Princeton, N.J., and generally comprises a scan element and scan engine (not depicted) and will be coupled, to trigger 100 by inserting coupling 108 by means of an illustrative USB plug and a port for reception of the USB plug. Of special note is trigger 100, which has special novelty. In particular, trigger 100 may be part of the ground signal-based activation circuit and is designed so as to reduce the power requirements of triggering or actuation of bar code reader 110, thereby extending the power of battery units of bar code reader 110. This is accomplished by using a ground signal, as opposed to using an actual power signal which consumes significant power during the course of usage by power signal transmissions when an operator presses an activation means. As specifically detailed in the illustrative electrical block diagram of FIG. 3a, the USB/Serial Connector portion highlighted shows the trigger actuation line 310 for actuating a scanning operation of the native scanning element within bar code reader 110 being connected via a line to pin 3 of a USB 8 pin female connector 350, and further includes a varistor 320 for protection against excessive transient voltage, and a collector supply voltage of 3.3 v with a 499 kΩ resistor 330. As also specifically shown in the illustrative electrical block diagram of FIG. 3b, the trigger 100 switch and coupling means 108 (cable connector) indicates that the above-referenced connection is effectuated via a trigger line 370 to pin 3 of a USB 8 pin male connector 360, which is then paired with a ground line 380 into pin 5 of the USB 8 pin male connector 360, so as to complete the structure of the novel ground signal actuation circuit. When the USB 8 pin male connector 360 is inserted into the USB 8 pin female connector 350, the respective aforementioned circuit structures are then paired up by the mating of the respective pin and pin 5 interfaces of the male and female connectors. Accordingly, when the switch 390 (e.g., push button 104) is depressed, the bar code reader 110 is able to detect the ground signal, thereby initiating the aforementioned scanning operation sequence activating the barcode scan engine (not depicted) to scan a given barcode 130. Note that the specifics described above and as depicted in regards to FIGS. 3a-3b are merely meant to be illustrative in nature, and are not necessarily meant to confine the invention to the particular elements therein, as other variations may also be substituted to achieve the overall purpose.

Having thus described a preferred embodiment of a finger point bar code input device, it should be apparent to those skilled in the art that certain advantages of the within system have been achieved. It should also be appreciated that various modifications, adaptations, and alternative embodiments thereof may be made within the scope and spirit of the present invention. The invention is further defined by the following claims.

What is claimed is:

1. A bar code input device, comprising:
  a bar code scanner means having a ground signal-based activation circuit for detecting a ground signal;
  an attachment means for attaching said bar code input device to a body of an operator within a general vicinity and at in a general direction of a bar code symbol to be scanned by said bar code scanner means during a scanning operation, said attachment means further being situated on an operator's body so as to not to interfere with normal use of hands of said operator; and
  a no-power supplied trigger means connected to said bar code scanner means for activating said bar code scanner means, wherein said trigger means includes a ground signal-based activation circuit for completing said ground signal-based activation circuit and a push button that, when depressed, provides a ground signal that is detected by said bar code scanner means for no-power supplied activating of a scanning operation by said bar code scanner means.

2. The bar code input device according to claim 1, wherein said attachment means comprises a glove adapted to be worn on a system operator's hand.

3. The bar code input device according to claim 2, wherein said no-power supplied trigger means actuates said ground signal so as to turn on said bar code scanner means continuously for a fixed time until a good bar code read occurs during a given said scanning operation.

4. The bar code input device according to claim 3, wherein said bar code input device includes at least one battery unit and wherein said no-power supplied trigger means extends a power of said at least one battery unit and further comprises a coupling means for coupling said push button to said bar code scanner means.

5. The bar code input device according to claim 4, wherein said coupling means further comprises a hard-wired connection.

6. The bar code input device according to claim 4, wherein said coupling means utilizes a radio frequency medium.

7. The bar code input device according to claim 5, wherein the bar code input device is adapted for both ambidextrous and hands-free operation and is further adapted so as to provide an ergo-dynamic, changeable positioning of said trigger means so as to reduce repetitive stress injuries.

8. The bar code input device according to claim 7, wherein the glove adapted to be worn on a system operator's hand further includes a flexible cover for cushioning and snag prevention.

9. The bar code input device according to claim 4, wherein said coupling means further comprises a trigger line paired with a ground line, through a pairing up of pin interfaces of male and female connectors.

* * * * *